United States Patent [19]

Ogawa et al.

[11] Patent Number: 5,497,201
[45] Date of Patent: Mar. 5, 1996

[54] SYNC CHIP CLAMPING/SYNC SEPARATOR CIRCUIT

[75] Inventors: Akihide Ogawa, Nagasaki; Hiroshi Yamagata, Kanagawa; Kazuhiro Takeda, Nagasaki; Yoshiharu Ito, Tokyo, all of Japan

[73] Assignee: Sony Corporation, Japan

[21] Appl. No.: 278,149

[22] Filed: Jul. 21, 1994

[30]     Foreign Application Priority Data

Jul. 27, 1993  [JP]  Japan .................... 5-204684

[51] Int. Cl.⁶ .................................................... H04N 5/08
[52] U.S. Cl. ............................................ 348/525; 348/532
[58] Field of Search ............................ 348/525–535, 348/500, 464, 689, 695–697, 682–684; 307/41, 77, 78, 89, 87, 98, 309, 312, 313, 316, 321–324; 330/252, 253, 260; H04N 5/08, 5/10

[56]            References Cited

U.S. PATENT DOCUMENTS

| | | | |
|---|---|---|---|
| 4,458,212 | 7/1984 | Brehmer et al. | 330/260 |
| 4,484,148 | 11/1984 | Wieser et al. | 330/260 |
| 4,893,092 | 1/1990 | Okamoto | 330/253 |
| 4,999,707 | 3/1991 | Hirao et al. | 348/525 |
| 5,027,017 | 6/1991 | Fling | 348/695 |
| 5,045,806 | 9/1991 | Yan | 330/252 |

FOREIGN PATENT DOCUMENTS 0184055  8/1986  Japan ............................ H04N 5/080

*Primary Examiner*—Victor R. Kostak
*Assistant Examiner*—Michael H. Lee
*Attorney, Agent, or Firm*—Ronald P. Kananen

[57]              ABSTRACT

Reductions in size and cost for a sync chip clamping/sync separation circuit are envisaged by the use of the CMOS process. The final output amplification section of a differential amplifier circuit is implemented as a P channel FET, and the pull down current for the drain terminal of this P channel FET is set to a value which is smaller than the current which flows when this P channel FET is ON. A constant voltage is supplied by resistors to the non inverting input terminal (+) of the differential amplification circuit. Further, the inverting input terminal (−) of the differential amplification circuit and the output terminal thereof are connected, and also an input coupling capacitor is interposed between the inverting input terminal (−) thereof and an video signal input terminal. Further, a buffer is provided which takes out a sync signal from an input of the P channel FET.

8 Claims, 4 Drawing Sheets

SYNC CHIP CLAMPING/SYNC SEPARATOR CIRCUIT

BACKGROUND OF THE INVENTION

1. Field of the Invention

The present invention relates to a sync chip clamping/sync separator circuit for use in a video equipment, such as a television receiver, a video tape recorder or the like.

2. Description of the Related Art

Heretofore, video equipment includes a video signal clamping circuit to hold a peak portion of a sync (synchronizing) signal at constant voltage level independently of brightness or amplitude of a video signal.

FIG. 1 of the accompanying drawings shows an arrangement of a sync chip clamping circuit which is such a video signal clamping circuit.

Referring to FIG. 1, there is provided a video signal input terminal 1 to which a video signal Sv is supplied. An amplifying circuit 2 might be formed of an operational amplifier or the like. An anode of a diode 3 is connected to the output terminal of the amplifying circuit 2. A power supply 4 is connected between the non-inverting terminal (+) of the amplifying circuit 2 and ground. An input coupling capacitor 5 is connected between an inverting input terminal (−) of the amplifying circuit 2 and the video signal input terminal 1. The cathode of the diode 3 is connected to the inverting input terminal of the amplifying circuit 2. A current source 6 is provided in order to process a discharge current of the input coupling capacitor 5. Operation of the sync chip clamping circuit will be described below with reference to the waveform diagram forming FIG. 2.

When the video signal Sv reaches the sync chip period $T_1$, the voltage level at which the video signal Sv is held during this sync chip period $T_1$ drops below the voltage Vc of the power supply 4 so that an output voltage Va of the amplifying circuit 2 rises and varies as shown in FIG. 2. When the output voltage Va of the amplifying circuit 2 reaches a voltage higher than the voltage of the video signal Sv, the diode 3 is turned on and the input coupling capacitor 5 is charged thereby to prevent the voltage at the inverting input terminal of the amplifying circuit 2 from becoming lower than the voltage Vc. In this way, the sync chip clamping circuit is operated so that the sync chip, which is held at the lowest potential of the video signal Sv, is brought to the voltage level equal to the voltage Vc of the power supply 4. An integrated circuit manufactured by a bipolar process is used in order to implement the sync chip clamping circuit shown in FIG. 1 as an integrated circuit.

Because a digital signal processing is increased and the integrated circuit must be formed as the large scale integrated circuit, it is customary that a video signal is processed by an integrated circuit manufactured by a CMOS (complementary metal oxide semiconductor). With this CMOS process, however, it is impossible to implement a diode just in the manner, for example, of the diode 3 shown in FIG. 1. Japanese Patent Publication No. 4-31473 describes such a sync chip clamping circuit in which an integrated circuit according to the CMOS process is realized without using a diode.

FIG. 3 is a diagram showing a sync chip clamping circuit made by the CMOS process as disclosed in Japanese Patent Publication No. 4-31473.

Referring to FIG. 3, an amplifying circuit 11 comprises a plurality of CMOS transistors $Q_3$ through $Q_9$ and corresponds to the amplifying circuit 2 shown in FIG. 1. There are provided inverters 12, 13. In particular, the inverter 13 comprises a pair of CMOS transistors $Q_2$ and $Q_2$ as shown in FIG. 3. There are provided resistors 14, 15. These resistors 14, 15 and the inverters 12, 13 correspond to the diode 3 shown in FIG. 1. The resistors 14, 15 and the inverters 12, 13 can realize a similar function to that of the diode 3 by selecting a resistance value of the resistor 15 to be smaller than a resistance value of the resistor 14.

Moreover, the amplifying circuit 11 includes a phase compensation capacitor 16 to stabilize operation of the sync chip clamping circuit. The phase compensation capacitor 16 has a large capacitance because the inverters 12, 13 having an amplifying action are connected to the rear stage of the amplifying circuit 11. A resistor 17 is connected to the capacitor 16 in series in order to prevent a response speed of the amplifying circuit 11 from being decreased even when the phase compensation capacitor 16 is formed of a capacitor having a large capacitance.

In this connection, with a prior art type of sync chip clamping/sync separation circuit according to the CMOS process such as described above, since the resistor 17 for phase compensation is required to have high accuracy, therefore the area of this resistor 17 becomes large, and, together with the increase of the capacitance of the capacitor 16 for phase compensation to a large value, this means that problems arise of an increase in the overall size of the circuit, as well as an increase in the cost thereof.

SUMMARY OF THE INVENTION

An object of the present invention is to provide a sync chip clamping/sync separation circuit of which the size and the cost can be reduced.

According to an aspect of the present invention, there is provided a sync chip clamping/sync separation circuit which is comprised of a differential amplification circuit which comprises a final output amplification section comprising a P channel FET, with the drain terminal of the P channel FET being connected to an inverting terminal of a previous stage differential amplification section, a current limitation means which limits a current which pulls down the drain terminal of the P channel FET of the differential amplification circuit to a current which is less than the current which flows when the P channel FET is ON, a voltage supply means which supplies a constant voltage to a non inverting input terminal of the differential amplification circuit, an input coupling capacitor which is interposed between the inverting input terminal of the differential amplification circuit and a positive polarity video signal input terminal, and a sync signal output means which takes out a sync signal from an input of the P channel FET of the differential amplification circuit.

In accordance with another aspect of the present invention, there is provided a sync chip clamping/sync separation circuit which is comprised of an N channel FET whose gate terminal is connected to an output terminal of a differential amplification circuit, whose drain terminal is connected to a power source line, and whose source terminal is connected to an inverting terminal of the differential amplification circuit, a current limitation means which pulls down the source terminal of the N channel FET by a current which is less than the drive capacity of the N channel FET, a voltage supply means which supplies a constant voltage to a non inverting input terminal of the differential amplification circuit, an input coupling capacitor which is interposed between the inverting input terminal of the differential amplification circuit and a positive polarity video signal input terminal, and a sync signal output means which takes out a sync signal from an input of the N channel FET.

According to the present invention, the sync chip clamping can be performed without the requirement for any diode to be employed, by using a MOSFET source follower or open drain. Accordingly, it is possible to realize sync chip clamping and sync separation in CMOS with a simple circuit construction.

DETAILED DESCRIPTION OF THE PREFERRED EMBODIMENTS

The present invention will now be described in detail with reference to the accompanying drawings.

Figure 4:
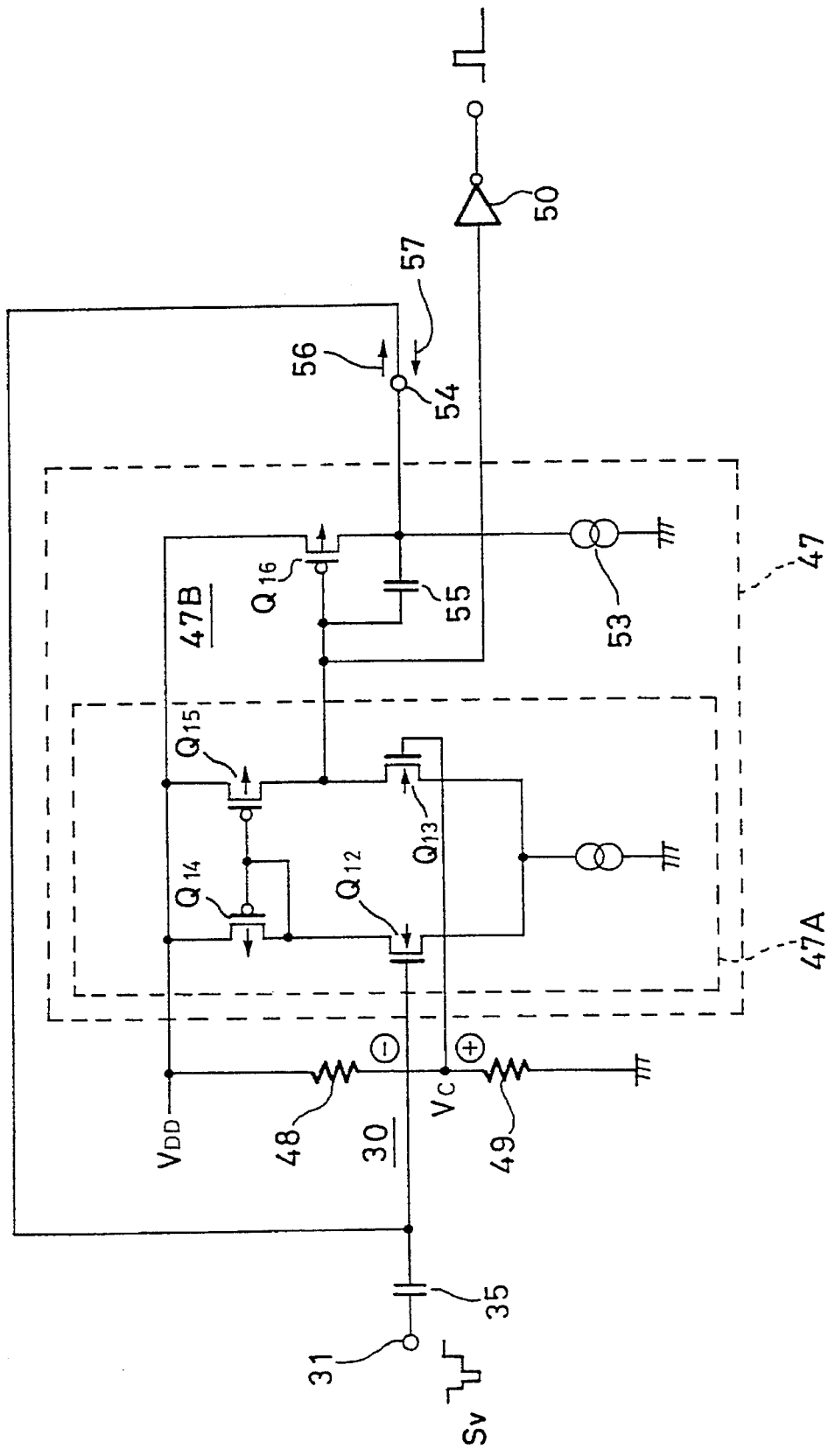
FIG. 4 is a diagram showing a sync chip clamping/sync separation circuit according to a first embodiment of the present invention.

FIG. 4 is a diagram showing a sync chip clamping/sync separation circuit according to a first embodiment of the present invention. Referring to FIG. 4, reference numeral 31 denotes an video signal input terminal, while reference numeral 35 denotes an input coupling capacitor of which one terminal is connected to the video signal input terminal 31 and the other terminal of which is connected to an inverting input terminal (−) of a differential amplifier circuit 47 (e.g., an operational amplifier). A composite video signal of positive polarity is supplied to this inverting input terminal (−) of the differential amplifier circuit 47 via the input coupling capacitor 35. A clamp voltage Vc which is produced by the division of a source voltage $V_{DD}$ by resistors 48 and 49 is supplied to the non inverting input terminal (+) of the differential amplifier circuit 47.

The differential amplifier circuit 47, as shown in FIG. 4, comprises a differential amplifier section 47A which comprises a pair of N channel MOSFETs $Q_{12}$ and $Q_{13}$ and a pair of P channel MOSFETs $Q_{14}$ and $Q_{15}$, and a final output amplifier section 47B which comprises a P channel MOSFET $Q_{16}$ and which amplifies the output of the differential amplifier section 47A. The gate terminal of the N channel MOSFET $Q_{12}$ of the differential amplifier section 47A serves as the inverting input terminal, while the gate terminal of the N channel MOSFET $Q_{13}$ serves as the non inverting input terminal.

The drain terminal of the P channel MOSFET $Q_{16}$ of the final output amplifier section 47B is connected to the inverting input terminal of the differential amplifier section 47A. Further, the gate terminal of the P channel MOSFET $Q_{16}$ is connected to the input terminal of a buffer 50 which is provided externally to the differential amplifier circuit 47. The sync signal is output from this buffer 50. Further, a capacitor 55 for phase compensation is connected between the gate terminal and the drain terminal of the P channel MOSFET $Q_{16}$. Reference numeral 53 depicts a constant current source which pulls down the drain terminal of the P channel MOSFET $Q_{16}$, and which is set to be smaller than the current which flows when the P channel MOSFET $Q_{16}$ is ON. The final output amplifier section 47B which is constituted by this P channel MOSFET $Q_{16}$ can be considered as a P channel open drain.

The above-described resistors 48 and 49 form the voltage supply means 30. Further, the above described video signal input terminal 31 corresponds to the positive polarity video signal input terminal.

Figure 1:
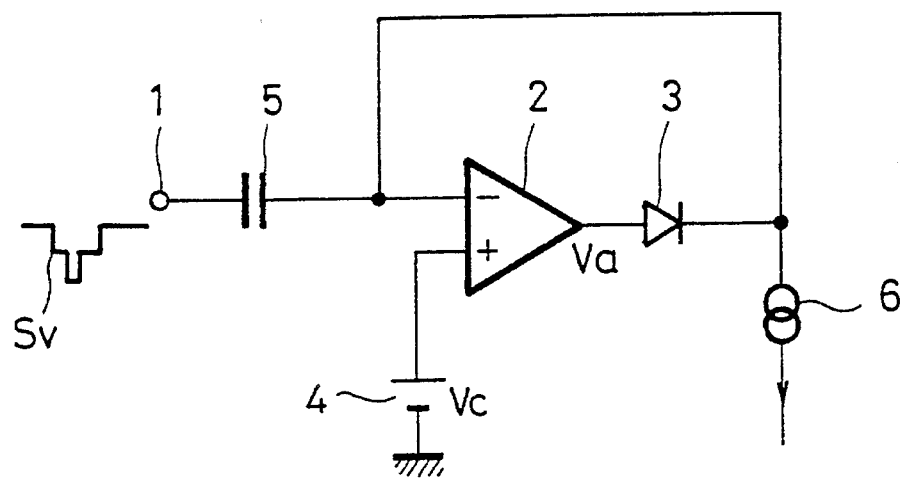
FIG. 1 is a diagram showing a sync chip clamping/sync separation circuit according to a related art.
Figure 2:
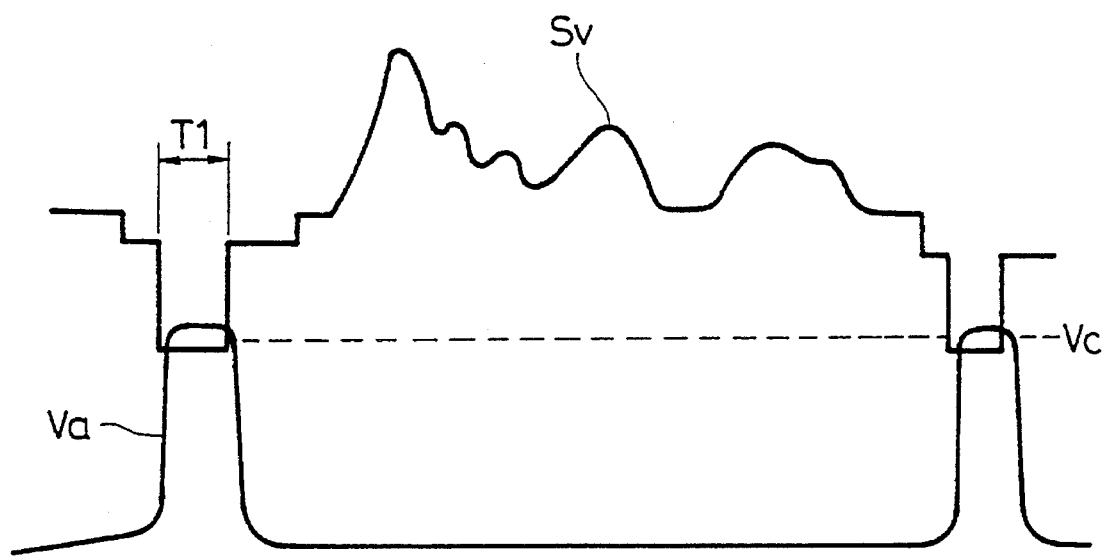
FIG. 2 is a diagram of waveforms of a video signal and the output of a differential amplifier circuit.

According to this type of arrangement, the composite video signal Sv which is supplied to the video signal input terminal 31 is transmitted to the inverting input terminal of the differential amplifier circuit 47 via the input coupling capacitor 35. The waveform of the composite video signal Sv passed through the input coupling capacitor 35 is identical to that shown in FIG. 2.

Further, when the composite video signal Sv reaches the interval $T_1$ of its sync chip, and its voltage becomes lower than the clamp voltage Vc, the P channel MOSFET $Q_{16}$ in the final output stage of the differential amplifier circuit 47 is turned ON. Due to this, since the drain current of the P channel MOSFET $Q_{16}$ is increased, a current flows in the direction shown by the arrow 56 in the figure and the input coupling capacitor 35 is charged up, and hence the voltage at the inverting input terminal of the differential amplifier circuit 47 becomes higher than the clamp voltage Vc. That is, the circuit functions such that during the interval $T_1$ of the sync chip of the composite video signal, the voltage at the inverting input terminal of the differential amplifier circuit 47 does not drop below the clamp voltage Vc.

Figure 3:
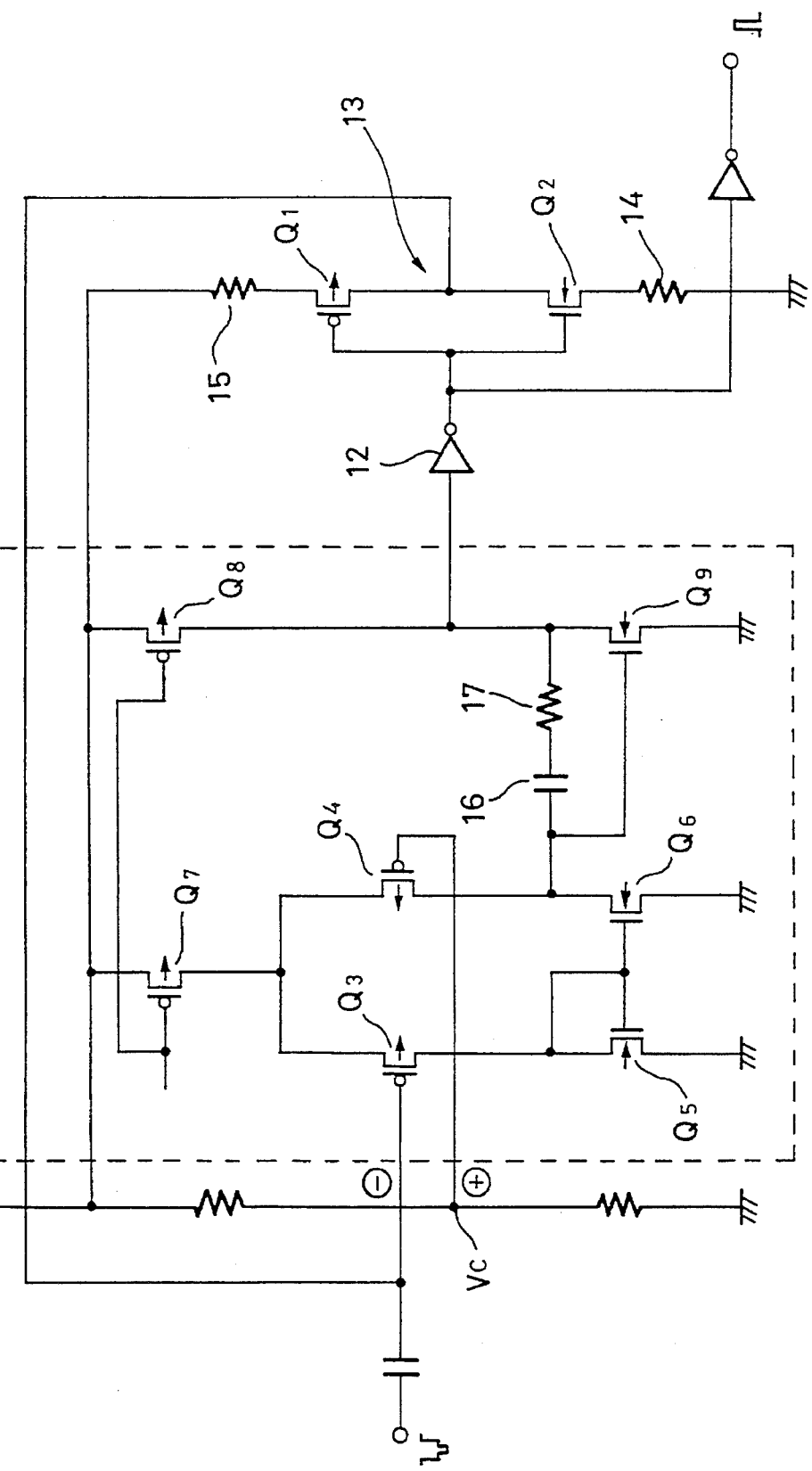
FIG. 3 is a diagram showing a sync chip clamping/sync separation circuit according to another related art.

In the first embodiment of the present invention, the output stage of the differential amplifier circuit 47 can be considered as a P channel open drain, since the capacity of the P channel MOSFET $Q_{16}$ is greater than the constant current source 53 which discharges the input coupling capacitor 35. Furthermore, since the current at the output terminal 54 of the differential amplifier circuit 47 which flows out in the direction shown by the arrow sign 56 is greater than the current which flows inward in the direction shown by the arrow sign 57, the same effect is obtained as with a diode. Yet further, since no circuit having amplifying effect external to the differential amplifier circuit 47 (like the buffers 12 and 13 of the related art shown in FIG. 3) is provided, there is no requirement for any expedient such as increasing the capacity of the phase compensation capacitor 55, or the like.

As described above, sync chip clamping and sync separation can be implemented in CMOS circuitry with a simple circuit construction by using the differential amplifier circuit 47 of which the output stage is constituted by a P channel MOSFET, according to the first embodiment of the present invention.

Figure 5:
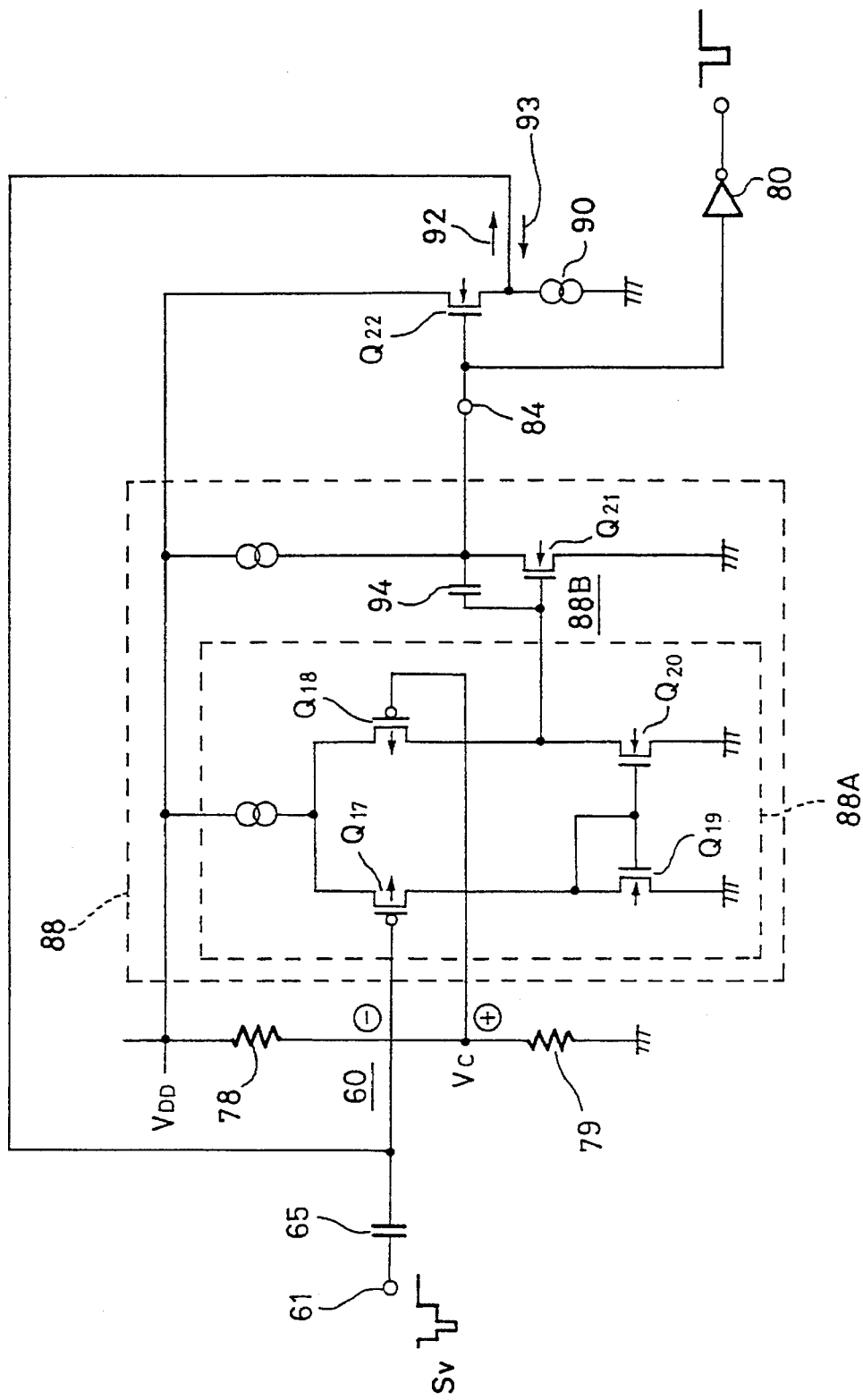
FIG. 5 is a diagram showing the sync chip clamping/sync separation circuit according to a second embodiment of the present invention.

FIG. 5 is a diagram showing the sync chip clamping/sync separation circuit according to a second embodiment of the present invention. Herein, the explanation of parts shown in FIG. 5 which correspond to the parts shown in FIG. 4 will be curtailed in the interests of brevity.

Referring to FIG. 5, reference numeral 88 denotes a differential amplifier circuit (e.g., an operational amplifier), to the inverting input terminal (−) of which a composite video signal of positive polarity is supplied from an video signal input terminal 61 via an input coupling capacitor 65. A clamp voltage Vc which is produced by the division of a source voltage $V_{DD}$ by resistors 78 and 79 is supplied to the non inverting input terminal (+) of the differential amplifier circuit 88.

The differential amplifier circuit 88, as shown in the figure, comprises a differential amplifier section 88A which comprises a pair of P channel MOSFETs $Q_{17}$ and $Q_{18}$ and a pair of N channel MOSFETs $Q_{19}$ and $Q_{20}$, and a final output amplifier section 88B which comprises an N channel MOSFET $Q_{21}$ and which amplifies the output of the differential amplifier section 88A. The gate terminal of the P channel MOSFET $Q_{17}$ of the differential amplifier section 88A serves as the inverting input terminal, while the gate terminal of the P channel MOSFET $Q_{18}$ serves as the non inverting input terminal thereof. The drain terminal of the N channel MOSFET $Q_{21}$ of the final output amplifier section 88B is connected to an output terminal 84. Further, a capacitor 94 for phase compensation is connected between the gate terminal and the drain terminal of the N channel MOSFET $Q_{21}$.

The gate terminal of an N channel MOSFET $Q_{22}$ is connected to the output terminal 84 of the differential amplifier circuit 88. The drain terminal of this N channel MOSFET $Q_{22}$ is connected to the power source line and is thus supplied with the power source voltage $V_{DD}$. Further, the source terminal of the N channel MOSFET $Q_{22}$ is connected to the inverting input terminal of the differential amplifier circuit 88, and also a signal is output from this source terminal. The N channel MOSFET $Q_{22}$ serves as a source follower, and its source terminal is pulled down by a current which is less than the drive capacity of this MOSFET $Q_{22}$. Reference numeral 90 denotes a constant current source which thus pulls down the source terminal of the N channel MOSFET $Q_{22}$.

The gate terminal of the N channel MOSFET $Q_{22}$ is connected to the input terminal of a buffer 80, and the sync signal is output via this buffer 80.

According to this type of arrangement, the composite video signal which is supplied to the video signal input terminal 61 is input to the differential amplifier circuit 88 via the input coupling capacitor 65. In this case, the waveform of the composite video signal Sv at the inverting input terminal of the differential amplifier circuit 88 is identical to that shown in FIG. 2.

Further, when the composite video signal Sv reaches its interval $T_1$ of the sync chip, and its voltage is lower than the clamp voltage Vc, the output voltage of the differential amplifier circuit 88 rises. Due to this, since the drain current of the N channel MOSFET $Q_{22}$ is increased, current flows in the direction shown by the arrow 92 in the figure and the input coupling capacitor 65 is charged up, and the voltage at the inverting input terminal of the differential amplifier circuit 88 becomes higher than the clamp voltage Vc.

Specifically, at the interval $T_1$ of the sync chip of the composite video signal, the differential amplifier circuit 88 operates so that the voltage at the inverting input terminal thereof does not drop below the clamp voltage Vc. Since the constant current source 90 is set to be lower than the current which flows in the N channel MOSFET $Q_{22}$, the current in the direction shown by an arrow 92 is greater than the current in the direction shown by an arrow 93, so that the same effect is achieved as when using a diode.

According to the second embodiment of the present invention, because the N channel MOSFET $Q_{22}$ serves as a source follower, and since the voltage amplification ratio is less than or equal to "1", there is no requirement for any expedient such as increasing the capacity of the phase compensation capacitor 94, or the like.

Further, in contrast to the case with the first embodiment shown in FIG. 4, either an N channel MOSFET or a P channel MOSFET can be used for the output stage of the differential amplifier circuit 88 is the second embodiment. In the second embodiment, the N channel MOSFET $Q_{21}$ was used. However, if a P channel MOSFET is used, the advantage is obtained of so called simplification of the circuitry.

In this manner, according to this second embodiment, by connecting a source follower to the output of the differential amplifier circuit, it is possible to obtain a sync chip clamping and sync separation circuit which is suitable for implementation in CMOS circuitry.

Now, although in the first and second embodiments described above an video signal of positive polarity was processed, it is also easy to deal with an video signal of negative polarity. In such a case, N channel FETs should be substituted in the construction for P channel FETs, P channel FETs should be substituted for N channel FETs, and pulling up should be substituted for pulling down.

According to the present invention, by using a differential amplifier circuit of which the output stage is constituted by a P channel MOSFET, it is possible to implement sync chip clamping and sync separation in CMOS circuitry with a simple circuit construction. Further, by connecting a source follower to the output of the differential amplifier circuit, it is possible in the same way to obtain a sync chip clamping and sync separation circuit by CMOS which is suitable for implementation in CMOS circuitry. In this case, since a capacitor of comparatively small capacity may be used for phase compensation, the advantages of reduction in size and of cost reduction are obtained. Further, since resistors are only required for producing the clamp voltage, it is sufficient to ensure relative accuracy thereof. Further, since the resistance values are not required to be particularly high, advantages of reduction in size and of cost reduction are obtained, just as with the capacitor for phase compensation.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A sync chip clamping/sync separation circuit comprising:

a differential amplification circuit which comprises a final output amplification section comprising a P channel FET, with the drain terminal of said P channel FET being connected to an inverting input terminal of a previous stage differential amplification section;

current limitation means which limits a current which pulls down the drain terminal of the P channel FET of said differential amplification circuit to a current which is less than the current which flows when said P channel FET is ON;

voltage supply means which supplies a constant voltage to a non inverting input terminal of said differential amplification circuit;

an input coupling capacitor which is interposed between the inverting input terminal of said differential amplification circuit and a positive polarity video signal input terminal; and sync signal output means which takes out a sync signal from an output of the previous stage differential amplification section, wherein said sync signal output means has an input connected between said output of the previous stage differential amplification section and the gate terminal of the P channel FET of said differential amplification circuit.

2. A sync chip clamping/sync separation circuit comprising:

an N channel FET whose gate terminal is connected to an output terminal of a differential amplification circuit, whose drain terminal is connected to a power source line, and whose source terminal is connected to an inverting input terminal of said differential amplification circuit;

current limitation means which pulls down the source terminal of said N channel FET by a current which is less than the drive capacity of said N channel FET;

voltage supply means which supplies a constant voltage to a non inverting input terminal of said differential amplification circuit;

an input coupling capacitor which is interposed between the inverting input terminal of said differential amplification circuit and a positive polarity video signal input terminal; and sync signal output means which takes out a sync signal from the output terminal of the differential amplification circuit, wherein said sync signal output means has an input connected between said output terminal of the differential amplification circuit and the gate terminal of said N channel FET.

3. A sync chip clamping/sync separation circuit as in claim 1, further comprising a phase compensation capacitor connected between the gate and the drain terminal of the P channel FET.

4. A sync chip clamping/sync separation circuit as in claim 1, wherein said current limitation means is a constant current source.

5. A sync chip clamping/sync separation circuit as in claim 2, further comprising a phase compensation capacitor connected between the gate and the drain terminal of a second N channel FET.

6. A sync chip clamping/sync separation circuit as in claim 2, wherein said current limitation means is a constant current source.

7. A sync chip clamping/sync separation circuit as in claim 1, wherein the final output amplification section comprises a P channel open drain.

8. A sync chip clamping/sync separation circuit as in claim 2, wherein the N channel FET serves as a source follower.

\* \* \* \* \*